United States Patent [19]

Backman

[11] 4,449,301
[45] May 22, 1984

[54] APPARATUS AND METHOD FOR DRAWING CURVES

[76] Inventor: Bo G. Backman, Vesslingegataw 11, 711 00 Lindesberg, Sweden

[21] Appl. No.: 346,031

[22] PCT Filed: May 26, 1982

[86] PCT No.: PCT/SE81/00154
§ 371 Date: Jan. 26, 1982
§ 102(e) Date: Jan. 26, 1982

[87] PCT Pub. No.: WO81/03561
PCT Pub. Date: Dec. 10, 1981

[30] Foreign Application Priority Data

Jun. 3, 1980 [SE] Sweden .................... 8004140

[51] Int. Cl.³ ............................................. B43L 13/00
[52] U.S. Cl. ............................... 33/32 E; 33/27 R; 33/32 C; 33/32 F
[58] Field of Search .............. 33/32 E, 1 M, 1 AA, 33/19 B, 20 B, 27 D, 27 G, 27 R, 32 C, 32 D, 32 F, 1 PT

[56] References Cited

U.S. PATENT DOCUMENTS

| 718,863 | 1/1903 | Norris | 33/27 D |
| 874,702 | 12/1907 | Patton | 33/27 D |
| 1,537,393 | 5/1925 | Walsh | 33/32 E |
| 2,343,035 | 2/1944 | Weihs | 33/27 G |
| 2,392,654 | 1/1946 | Fine | 33/19 B |
| 3,516,163 | 6/1970 | Hisserich | 33/19 A |
| 3,726,019 | 4/1973 | Adler | 33/18 R |
| 4,130,085 | 12/1978 | Hewitt | 33/32 E |

FOREIGN PATENT DOCUMENTS 2809480 of 0000 Fed. Rep. of Germany ... B43L/1300

Primary Examiner—Willis Little
Attorney, Agent, or Firm—Willian, Brinks, Olds, Hofer, Gilson & Lione, Ltd.

[57] ABSTRACT

A drawing apparatus is disclosed which has two wheels of equal diameter mounted coaxially on a frame. A writing implement is preferably mounted in a aperture at the midpoint of the line defined by the centers of the wheels. The wheels are driven by a pair of stepping motors which rotate in response to digital pulses. If the wheels are turned at the same rate in the same direction linear movement is accomplished. If the wheels are turned at the same rate in opposite directions, directional motion is accomplished.

18 Claims, 2 Drawing Figures

APPARATUS AND METHOD FOR DRAWING CURVES

FIELD OF THE INVENTION

This invention is directed to a system for drawing curves with two stepper motor driven wheels and a pencil.

For digital working equipment, such as computers, peripheral equipment, which can draw curves, outlines, pictures etc. is often desired. Such an item of peripheral equipment is the printer or plotter which gets information from a computer. With this information it will be able to control some kind of pencil in relation to, for instance, a sheet of paper. The method described in this patent can be beneficially used with digital working systems such as computers. Examples of applications: on a small scale with a minimum of moving parts it would be able to draw curves on a sheet of paper and on a large scale it would be able to draw outlines for cutting on sheets of metal etc.

SUMMARY OF THE INVENTION

A movement between two points, from point A to point B, can be done in two steps:
1. Determining the angle in relation to the momentary position and setting the equipment in the desired direction at point A towards point B.
2. Determining the distance between A and B and performing the linear movement from point A to point B.

Two coaxial wheels of the same size, that is wheels mounted along the same axle, when placed against a surface, will produce the desired change of the angle between the direction of the axle of the wheels and the surface, if both wheels are rotated by the same amount, but in opposite directions. One point at the middle of the axle will be stationary in relation to the surface. This corresponds to step 1 mentioned above.

If the wheels are then rotated by the same amount in the same direction, the middle point of the axle will move linearly in relation to the surface. This corresponds to step 2 mentioned above.

If sufficiently minute angles of rotation for the driving wheels are chosen, even arbitrarily good non-linear curves can be drawn with, what can be called, polar steps.

The innovation is based on the use of stepper motors, that is electrical motors which by using pulses of current in a number of windings can make the axle turn a certain step of angle. With such electrical motors you consequently create a desired total angle of rotation clockwise or anti-clockwise by sending a certain series of pulses of current. These movements are reversible and any accumulation of error in the angle of setting will not occur, so the momentary error in the angle of setting has an upper limit depending on certain limitations specific to each type of stepper motor.

DETAILED DESCRIPTION OF THE PRESENTLY PREFERRED EMBODIMENTS

The first preferred embodiment is a plotter for smaller surfaces.

Figure 1:
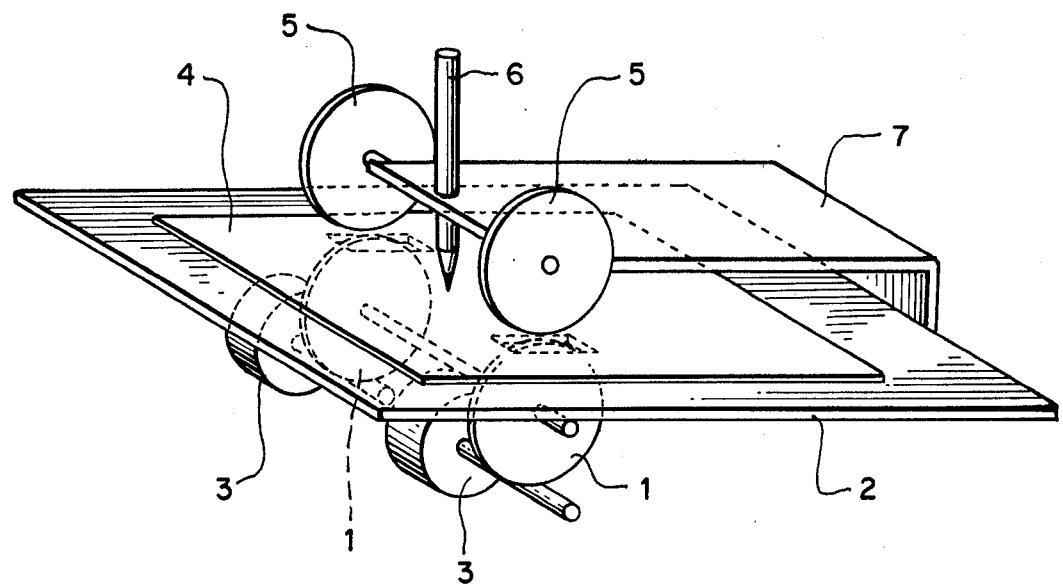
FIG. 1: The first embodiment of the invention.

The figures below refer to drawing FIG. 1. For drawing curves on a smaller sheet of paper the innovation can be designed so that two driving wheels (1) are mounted coaxially under a plane surrounding surface (2) and are driven by separate stepper motors (3). On the supporting surface you place a sheet of paper (4) which will be pressed against the driving wheels by two coaxially mounted freerunning supporting wheels (5). Through the centre between the supporting wheels some kind of pencil (6) is attached agains the paper. The supporting wheels and the pencil are kept in their places by an arm (7), that can be turned downwards.

The paper can be turned towards the desired direction with the pencil in the centre of rotation by turning the stepper motors and the driving wheels the same amount but in different senses of rotation.

A linear movement of the paper is achieved by turning the stepper motors and the driving wheels the same amount in the same sense of rotation so that the pencil draws a line.

The second preferred embodiment is a plotter for bigger surfaces.

Figure 2:
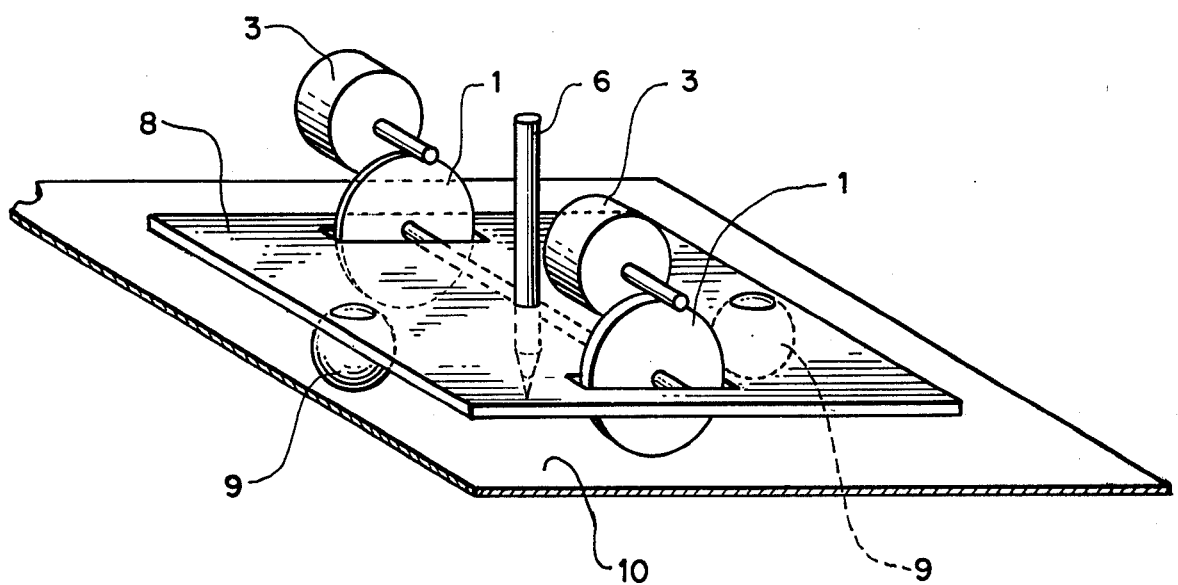
FIG. 2: The second embodiment of the invention.

The figures below refer to drawing FIG. 2. For drawing curves on bigger surfaces, for instance on big sheets of metal, the innovation can be designed so that two driving wheels (1) are coaxially mounted on a chassis (8) and are driven by separate stepper motors (3). The chassis also has two supporting balls (9) which create little friction. The chassis is placed on the drawing surface (10). Through the centre between the driving wheels some kind of pencil (6) is attached on the drawing surface.

The chassis can be turned in the desired direction with the pencil in a point on the drawing surface by turning the stepper motors and the driving wheels the same amount but in different senses of rotation.

A linear movement of the chassis can be achieved by turning the stepper motors and the driving wheels the same amount in the same sense of rotation so that the pencil draws a line.

I claim:

1. An apparatus for drawing curves on a recording surface, the apparatus comprising:
   a chassis having a first side and a second side;
   first and second wheels;
   means for rotatively mounting the first wheel to the first side of the chassis and for rotatively mounting the second wheel to the second side of the chassis such that said first and second wheels rotate about a common axis;
   first and second stepper motors mounted on the chassis for rotatively driving a respective one of said first and second wheels;
   a drawing implement having an operative end abutting the recording surface at a contact point; and
   means for mounting said drawing implement to the chassis such that when said first and second wheels are both driven at a first selected rate in an opposite direction, a change of angle will occur between the common axis and the recording surface with a center of rotation at the contact point, and when said first and second wheels are both driven at a second selected rate in an identical direction, a linear movement between the drawing implement and the recording surface will occur.

2. The curve drawing apparatus of claim 1 wherein said wheels are supported by said recording surface.

3. The curve drawing apparatus of claim 1 wherein said first and second stepper motors independently rotate said first and second wheels in response to electrical signals.

4. The curve drawing apparatus of claim 3 wherein said electrical signals are electronic pulses generated by a digital computer.

5. The curve drawing apparatus of claim 2 further comprising at least one caster disposed between the chassis and the recording surface, said at least one caster providing pivotal support for the chassis.

6. The curve drawing apparatus of claim 1 wherein said drawing implement is disposed at a point on the common axis equidistant from the first and second wheels.

7. The invention of claim 1 wherein said means for mounting said drawing implement to the chassis is an aperture included in the chassis.

8. An apparatus for drawing curves on a recording surface, the apparatus comprising:
   a chassis having a first side and a second side;
   first and second driving wheels, having the same diameter, said driving wheels engaging a recording surface for providing movement relative thereto;
   an axle for rotatively mounting the first driving wheel adjacent to the first side of the chassis and for rotatively mounting the second driving wheel to the second side of the chassis;
   a recording implement;
   an aperture, included in the chassis, disposed equidistantly between the two wheels for mounting the recording implement to contact the recording surface;
   a first caster means mounted on the chassis to contact the recording surface;
   a second caster means mounted on the chassis to contact the recording surface;
   a first stepper motor for rotatively driving the first driving wheel in response to pulses generated by a digital computer; and
   a second stepper motor for rotatively driving the second driving wheel in response to pulses generated by a digital computer;
   wherein the first and second stepper motors cooperate to cause rotational movement of the chassis with respect to the recording surface when the first and second stepper motors turn in opposite directions, and to cause linear movement of the chassis with respect to the recording surface when the first and second stepper motors turn in an identical direction.

9. A method for accurately producing a curve on a writing surface, which method comprises:
   mounting a writing implement at a point midway between a pair of spaced apart coaxial wheels of the same diameter such that an operative end of the writing implement contacts the writing surface;
   driving each wheel individually with a stepper motor at a first selected rate of speed in opposite directions in response to a predetermined series of digital signals to obtain pivotal movement of the writing implement with respect to the writing surface; and
   driving both wheels in a selected direction, at a second selected rate of speed to produce linear movement of the writing implement with respect to the writing surface.

10. The method of claim 9, further comprising the step of transmitting a predetermined series of digital pulses to each stepper motor to effect the pivotal and the linear movement of the writing implement with respect to the writing surface.

11. A system for drawing curves on a sheet of paper disposed upon a plane support having a first surface and a second surface, the system comprising:
   a first driving wheel and a second driving wheel;
   means for rotatively and coaxially mounting said first and second driving wheels to engage the first surface of the plane support such that said first and second driving wheels are adapted to impart rotational and translational motion to the plane support;
   a first stepper motor adapted to rotate the first driving wheel in a clockwise and a counterclockwise direction and a second stepper motor adapted to independently rotate the second driving wheel in a clockwise and a counterclockwise direction;
   a first freerunning wheel and a second freerunning wheel;
   means for rotatively and coaxially mounting said first and second freerunning wheels so that they bear against at least one of the second surface of the plane support and the sheet of paper disposed upon the plane support; and
   means for disposing a writing implement having an operative end such that the operative end contacts the sheet of paper disposed upon the plane support.

12. The system of claim 11, further comprising means for adjusting the first and second freerunning wheels and the writing implement so that the sheet of paper may be removed from the plane support and a new sheet of paper may be disposed thereupon.

13. The system of claim 11 wherein the means for disposing the writing implement is defined by the means for mounting the first and second freerunning wheels.

14. The system of claim 11, wherein the means for rotatively and coaxially mounting the first and second driving wheels comprises an axle.

15. The system of claim 11, wherein the means for rotatively and coaxially mounting the first and second freerunning wheels comprises an axle.

16. The system of claim 15, wherein the means for disposing the writing implement comprises an aperture defined by the axle.

17. A method for drawing curves on a sheet of paper disposed upon a plane support having a first surface and a second surface, the method comprising:
   (a) providing an apparatus that includes: a first driving wheel and a second driving wheel; means for rotatively mounting said first and second driving wheels to engage the first surface of the plane support; a first stepper motor adapted to rotate the first driving wheel in a clockwise and a counterclockwise direction and a second stepper motor adapted to independently rotate the second driver wheel in a clockwise and a counterclockwise direction; a first freerunning wheel and a second freerunning wheel; means for rotatively mounting said first and second freerunning wheels so that they bear against the second surface of the plane support; and means for disposing a writing implement having an operative end such that the operative end contacts the sheet of paper disposed upon the plane support;

(b) rotating the first and second driving wheels in an opposite direction until they attain a desired orientation relative to the plane support;

(c) rotating the first and second driving wheels in the same direction such that the writing implement draws a line on the sheet of paper in a direction corresponding to the orientation of the driving wheels; and (d) repeating steps (b) and (c) until a desired curve is drawn.

18. A method according to claim 17, wherein steps (b), (c) and (d) are accomplished by transmitting electrical signals from a digital computer to the first and second stepper motors.

* * * * *

UNITED STATES PATENT AND TRADEMARK OFFICE
CERTIFICATE OF CORRECTION

PATENT NO. : 4,449,301

DATED : May 22, 1984

INVENTOR(S) : Bo G. Backman

It is certified that error appears in the above-identified patent and that said Letters Patent is hereby corrected as shown below:

ON THE FRONT PAGE OF THE PATENT

At the PCT filing date, please delete "May 26, 1982", and substitute therefor --May 26, 1981--.

IN THE PATENT SPECIFICATION

Column 2, line 4, please delete "surrounding" and substitute therefor --supporting--;

Column 2, line 10, please delete "agains" and substitute therefor --against--.

Signed and Sealed this

Twenty-sixth Day of November 1985

[SEAL]

Attest:

DONALD J. QUIGG

Attesting Officer

Commissioner of Patents and Trademarks